United States Patent
Lincoln et al.

(10) Patent No.: US 9,602,327 B2
(45) Date of Patent: Mar. 21, 2017

(54) METHOD AND APPARATUS FOR ASYNCHRONOUS INFORMATION TRANSACTIONS

(75) Inventors: Adrian David Lincoln, Hurstpierpoint (GB); Charlie William Debney, Kintbury (GB)

(73) Assignee: VODAFONE LTD., Newbury, Berkshire (GB)

( * ) Notice: Subject to any disclaimer, the term of this patent is extended or adjusted under 35 U.S.C. 154(b) by 1213 days.

(21) Appl. No.: 09/855,142

(22) Filed: May 14, 2001

(65) Prior Publication Data

US 2001/0054108 A1 Dec. 20, 2001

(30) Foreign Application Priority Data

May 15, 2000 (GB) ...................................... 0011680

(51) Int. Cl.
*H04L 29/06* (2006.01)
*H04L 12/781* (2013.01)
*H04Q 11/00* (2006.01)

(52) U.S. Cl.
CPC .............. *H04L 29/06* (2013.01); *H04L 45/52* (2013.01); *H04L 63/0478* (2013.01); *H04Q 11/0067* (2013.01)

(58) Field of Classification Search
USPC ........................................ 709/201, 202, 203
See application file for complete search history.

(56) References Cited

U.S. PATENT DOCUMENTS

| | | | |
|---|---|---|---|
| 5,430,727 A | 7/1995 | Callon | |
| 5,694,546 A * | 12/1997 | Reisman | ......................... 705/26 |
| 5,796,941 A * | 8/1998 | Lita | ................................ 726/29 |
| 5,862,344 A * | 1/1999 | Hart | ............................ 709/238 |
| 5,907,801 A | 5/1999 | Albert et al. | |
| 5,946,467 A | 8/1999 | Pathakis et al. | |
| 5,974,452 A | 10/1999 | Karapetkov et al. | |
| 6,009,422 A * | 12/1999 | Ciccarelli | |
| 6,094,708 A * | 7/2000 | Hilla et al. | .................... 711/138 |

(Continued)

FOREIGN PATENT DOCUMENTS

EP 0 702 477 A2 3/1996
WO WO 97/24832 7/1997

(Continued)

OTHER PUBLICATIONS

Reed, Michael G. et al, "Proxies for Anonymous Routing," Dec. 1996, IEEE, pp. 95-104.*

(Continued)

*Primary Examiner* — Azizul Choudhury
(74) *Attorney, Agent, or Firm* — B. Aaron Schulman, Esq.; Nicholas Trenkle; Stites & Harbison, PLLC.

(57) ABSTRACT

A method of responding to an information request involved in an asynchronous data transaction is described. An information request is produced in a client device and then wrapped in one or more layers to produce a request package. The request package is transmitted over a distributed network comprising a plurality of processing nodes. Layers are added to and/or removed from the package at one or more of the nodes. The package is processed at its final destination, and a response package is generated for transmission back to the client device via the distributed network.

13 Claims, 2 Drawing Sheets

(56) References Cited

U.S. PATENT DOCUMENTS

| | | | | |
|---|---|---|---|---|
| 6,226,680 B1 * | 5/2001 | Boucher et al. | ............... | 709/230 |
| 6,233,601 B1 * | 5/2001 | Walsh | ........................... | 709/202 |
| 6,311,216 B1 * | 10/2001 | Smith et al. | ................... | 709/226 |
| 6,549,519 B1 * | 4/2003 | Daines et al. | ................ | 370/238 |

FOREIGN PATENT DOCUMENTS

| WO | WO 98/34386 | 8/1998 |
|---|---|---|
| WO | WO 99/30295 | 6/1999 |
| WO | WO 99/56445 | 11/1999 |

OTHER PUBLICATIONS

Syverson, Paul F. et al, "Anonymous Connections and Onion Routing," May 1998, vol. 16, Issue 4, IEEE, pp. 44-54.*

* cited by examiner

METHOD AND APPARATUS FOR ASYNCHRONOUS INFORMATION TRANSACTIONS

BACKGROUND OF THE INVENTION

This invention relates to asynchronous information or data transactions, and may be used, for example, in connection with the accessing of web sites on the internet.

Web sites may be accessed from a fixed or mobile location and may be configured as Internets, Intranets, Extranets or a combination of these options. However, all such web sites must handle interact with a client. A typical interaction model is based on a synchronous transaction in which a client makes a request and a response is received within the same session. Such a session usually only lasts a short time after the request, the duration being defined by a predetermined timeout value.

The increased use of Internet type services has led to a need to handle client requests in which a single request to make a search for information or a service may not be satisfied within a single session or by a single information provider. These requests are typically based on a set of personalised criteria for an individual, for example, "Please find me the best air fare to Sydney and let me know your findings by next Tuesday". This request could be formed and then sent to a set of potential suppliers of information. However, the nature of this query is such that the client does not require an immediate response and neither does the information supplier need to be able to provide the requested information instantly.

The information needed to answer the exemplary question above may be resolved using several techniques. Current techniques include search engines, specialised travel applications, human negotiation or a combination of these techniques. The results returned can then be assessed in the light of the original criteria prior to delivery to the client. How these results are assessed is not the subject of this application.

Another example of a request which may not be satisfied within a single session or by a single information provider is when there is a requirement for a request that includes monitoring for external information, for example, "let me know when the share price for a company reaches a certain price?" or "Tell me if you find a house in a specific area that meets my requirements". These cases may have little if any defined time associated with the feedback.

The nature of these asynchronous requests is such that, although some results may be available quickly, the client does not need them until a specific time. The exact time at which the information is returned will vary but how and when it is delivered to the client is an issue that has to be addressed. This could, for example, include early delivery should an information provider wish to make a client aware of special offers etc.

A problem with asynchronous activities of this type is that of managing the request and subsequently delivering the response(s) to the client. Within a small system where the number of requests are low, this is unlikely to be an onerous task, as it could well be managed with the aid of a database system. However, when the volume of transfers and size of the system becomes large, the management of these transactions is no longer a trivial task and presents an onerous overhead.

It is an object of the present invention to provide apparatus and methods for handling asynchronous requests of this type.

BRIEF SUMMARY OF THE INVENTION

According to the invention, there is provided a data package for holding an information request and corresponding response data, comprising a plurality of layers, the layers including a routing layer and a client request layer respectively containing routing information and an information request, the container being transmittable over a distributed network including a plurality of processing nodes and each layer being interpretable by only a subset of the processing nodes.

According to the invention, there is also provided apparatus for responding to an information request, comprising means for providing an information request in a client device, wrapping means for wrapping the information request in one or more layers to produce a request package, transmitting means for transmitting the request package over a distributed network comprising a plurality of processing nodes, means for adding and/or removing layers from the package at one or more of the nodes, processing means for processing the package at its final destination, and means for generating a response package for transmission back to the client device via the distributed network.

According to the invention, there is further provided a method of responding to an information request, comprising the steps of providing an information request in a client device, wrapping the information request in one or more layers to produce a request package, transmitting the request package over a distributed network comprising a plurality of processing nodes, adding and/or removing layers to or from the package at one or more of the nodes, processing the package at its final destination, and generating a response package for transmission back to the client device via the distributed network.

BRIEF DESCRIPTION OF THE DRAWINGS

Methods and apparatus embodying the invention for use in asynchronous data transactions, and data configured in accordance with the invention for use in asynchronous data transactions, will now be described by way of example with reference to the drawings which are block diagrams showing the data configurations.

DESCRIPTION OF PREFERRED EMBODIMENTS

Figure 1:
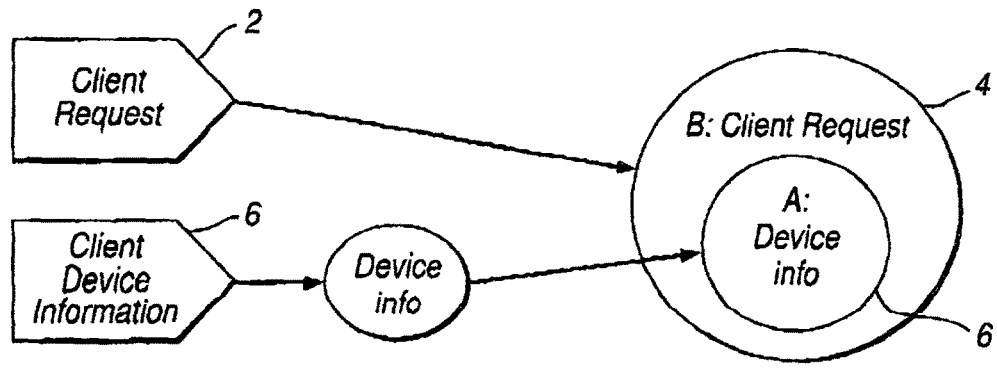

The apparatus and method described below support both the handling of information and its management in a generalised manner that is suitable for highly scalable, distributed systems. Using, but not limited to, an implementation in a generalised markup language such as XML, the method is based on the concept of encapsulation of information within wrappers.

The generic idea is to 'pull' the requested information together in a structured form that can be held as a composite but protected item. The "request" can then be delivered to each of the content providers and, upon its return, be used to provide the information needed to check and satisfy the original request.

This concept has been translated into a layered model in which each layer has meaning at the time it is processed whilst removing the need to have detailed knowledge of the remainder of the data.

In this way, the flow of information associated with a multipart transaction may be managed. The transaction is typically a request that is constructed from information of different types and which can result in multiple asynchronous responses within a highly distributed system.

The start of the process is to collect the request information. For example, the following information may be needed to handle a single request:
  Client Device Information
  User ID—which may need to be anonymous
  User Input
  Application Specific preferences for the specific user
  Application Service providers Some of this information only has meaning for the client device management system, whilst other items of the information may be associated with routing the information through a processing chain or application server(s). Consequently, the information can be functionally separated into elements that relate to:
  client device identification and delivery
  application request (which may include users input and their personal preferences)
  processing chain and routing Client device and user identification information is needed for two reasons. Firstly it is needed to determine the style and format of any response that may be sent to the client should the response be returned within the active session time, and secondly it is needed to provide an index into personal details such as the user's preferences or their anonymous ID. It should be noted that in practice the response will go back to the originator but not necessarily to the originating device. For example, a response at a later time could well be directed to the client's message store and an alert be sent to the client using a text message (e.g. SMS (short message service)) or "push" (that is, services or information supplied to the user other than at the user's request).

Application Request and Preferences information is used to identify the information that the application needs and could include user input as well as information that is extracted from the user's personal preferences database. For example, the client request could include details of the application that is being run. This "Application Tag" could provide a reference into an "Application Registry" that would detail the personal information that needs to be retrieved prior to delivery of the request.

The "Application Registry" could also contain details relating to the privacy status of the information.

Processing and Routing information is used to identify the sequence of steps needed to process the information request. Information that is defined by the application can be collected and encapsulated for delivery. The destination(s) to which the request should be sent can be obtained and this used to define the routing.

In operation, the system wraps (or encapsulates) information that is moved between processing steps. In practice, the outermost layer of each object contains the information needed to control the current processing, with inner layers containing information that is used at other phases of the processing.

At each stage, the inner layers can remain intact and undisturbed. This method ensures that the information flows through the system efficiently. It can also be used to support privacy policies through the encryption of desired elements to prevent them being accessible without suitable keys.

Layers are added and removed as processing progresses through the system.

The ability to send a complete package through the whole system significantly reduces the overhead of managing information independently.

To further illustrate the concept, a process example is described below.

The process may start with a simple request from a client. The information from the request together with client device information and other information that the application requires is retrieved and packaged within an XML structure. A further layer containing routing information relating to the next stage in the processing is added and used to control the movement of the through the system.

Any further processing steps result in additional layers being added and others removed as they are used.

Using this approach, a well-defined interface can be defined between the client side processing and each Application Server. This interface can detail the elements needed by the Application Server as well as those elements that should be preserved.

A generic "Common" application interface that can ensure basic processing can always be performed at least to the extent needed to identify problems that may exist. Elements to support specialisation for specific applications can be added.

Information contained in this interface may include, for example:
  Client device user agent
  Client ID—which may start as a msisdn but may well be replaced with an anonymous user ID to allow transfer to third parties
  Application specific data input by the client
  Application specific routing to identify where the information should be sent.

Some parts of this data are not required by the Application Server e.g. Client Device User Agent and identity and therefore may be encrypted but retained within the transmitted data structure. It may be that private information needs to be sent to the Application Server and this may be transported in an encrypted form.

However, the ability to transport a complete package including information that would otherwise have to remain on the client side simplifies the data management process by eliminating the need for client side storage and the overheads associated with its management.

As part of the interface mechanism, each package sent may be noted and relevant details retained to maintain an audit trail as required.

The results of the request from one or more application servers may be one or more objects that are constructed in a similar manner to the request and with the key response information and source being at the core of the returning object. Each layer added aids with routing and processing the information. The exact elements returned form part of the Application Interface.

It should be noted that any component can determine from the outermost layer whether it needs to process the current object or pass it directly elsewhere for processing.

Those objects that are not for processing by the current processing element may well fall into the category of ill-routed objects. These ill-routed objects can be handled by sending them to a suitable routing process that can interpret the information contained within the outermost layer to redirect them to a suitable application.

The requirement to monitor activity may be limited to specific events or may detail selected information relating to the nature of the request and subsequent response.

One requirement may be to determine if each request has been handled within the required time. Information from a packet can be extracted to determine when a response is expected/required. If no response is received, then this can be used both to determine service levels as well as proactively to respond to a client informing them that no information was received.

Since all information is available, auditing of incoming responses provides a straightforward method to handle content specific billing. For example, when the response is received, it can be checked in relation to the outgoing request. If it meets the requirement the response can be delivered to the client and a suitable charge calculated and billed.

Other monitoring functions can be achieved using a similar mechanism.

The processes described above have the ability to handle asynchronous requests which may or may not be time-limited. One function that can be supported is the ability to pass a request to "Agents" that in due course perform functions such as monitoring share prices against pre-defined criteria and then in due course respond when defined conditions have been met. Another example may be more involved such as monitoring for cheap holidays in a place that the user is known to like and at the times of the year when they generally take their holiday (the personal criteria having been derived from a range of accessible databases or other applications).

These agents can act as Watchers providing users with the added value of monitoring whole ranges of information providing responses at indeterminate times.

The method outlined above can be used to handle interactive requests that result in both synchronous and asynchronous responses and ensure that the results can be delivered in an efficient manner to the client.

The fact that each object contains the data associated with the request (and subsequently response information) with the information related to its processing removes the need for a centralised management system, and hence makes it highly scalable.

In summary, the system described above simplifies the management and processing of information requests and subsequent responses. By maintaining information relating to a single request in a consistent and distributable form, it provides a highly flexible, extendible, and scalable solution for the management of both synchronous and asynchronous requests from clients. The ability to transport secure information within the package whose access can be tailored to a specific requirement supports a flexible and secure interface suitable for disclosure to third parties for a full range of interactive information and games services.

A comparable prior art approach for handling the same type of transaction would be a relational database. At each stage of the process, an application interacts with the database making this central to the operation and performance of the system. As the system grows and number of external interactions expands, there will be high demand on the database, which although it may be distributed, could represent a significant overhead that may be difficult to scale.

Another approach to address some of the problems associated with developing applications of the type illustrated would be to develop individual applications that are capable of managing the processing of the specialised requests and collating results for delivery to the client.

A detailed implementation is now described.

A typical request may be made via an internet or 'phone connection (SMS, (short message service) WAP (wireless application protocol) etc). Each of these request types has a limited session time. The request is packaged into a suitable form and distributed to one or more application servers who will subsequently deliver some response. Some time later, responses will be received and the interactive system will select information that satisfies the clients' request. The client needs to be informed that information is available for them. The fact that they may not be online or have their 'phones operating poses potential problems. However, each user within the system has a message store in at least one form so that results can be posted to this location. In parallel with the storing activity, the user can be alerted to the availability of results via SMS or email or, in due course, via WAP push or other techniques that evolve.

In reviewing this example, it can be seen that the significant feature of the invention is the ability to handle the asynchronous multiple response nature of the requests.

The nature of the solution is that it is flexible and can support different architectures where several elements are involved in this process. As an example:

1. With reference to FIG. 1, a request 2 from a client device is received. This is used to create the basic request object 4. Information 6 about the client device is encapsulated within the request object 4 so that it is available later should it be required. The client device information may be encrypted so that it is meaningless outside the system for cases when third party organisations are involved. This enables all information to be kept together.

Figure 2:
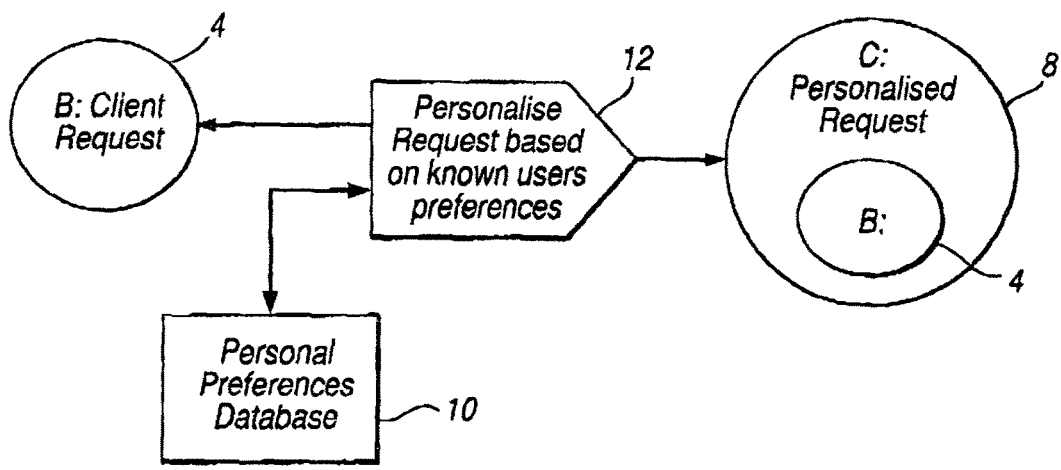

2. With reference to FIG. 2, the request object 4 together with any appropriate personalised information is packaged at 12 into a personalised request 8 suitable for the range of applications that can be used to find the requested information. The personalisation information may be derived from a database 10.

Figure 3:
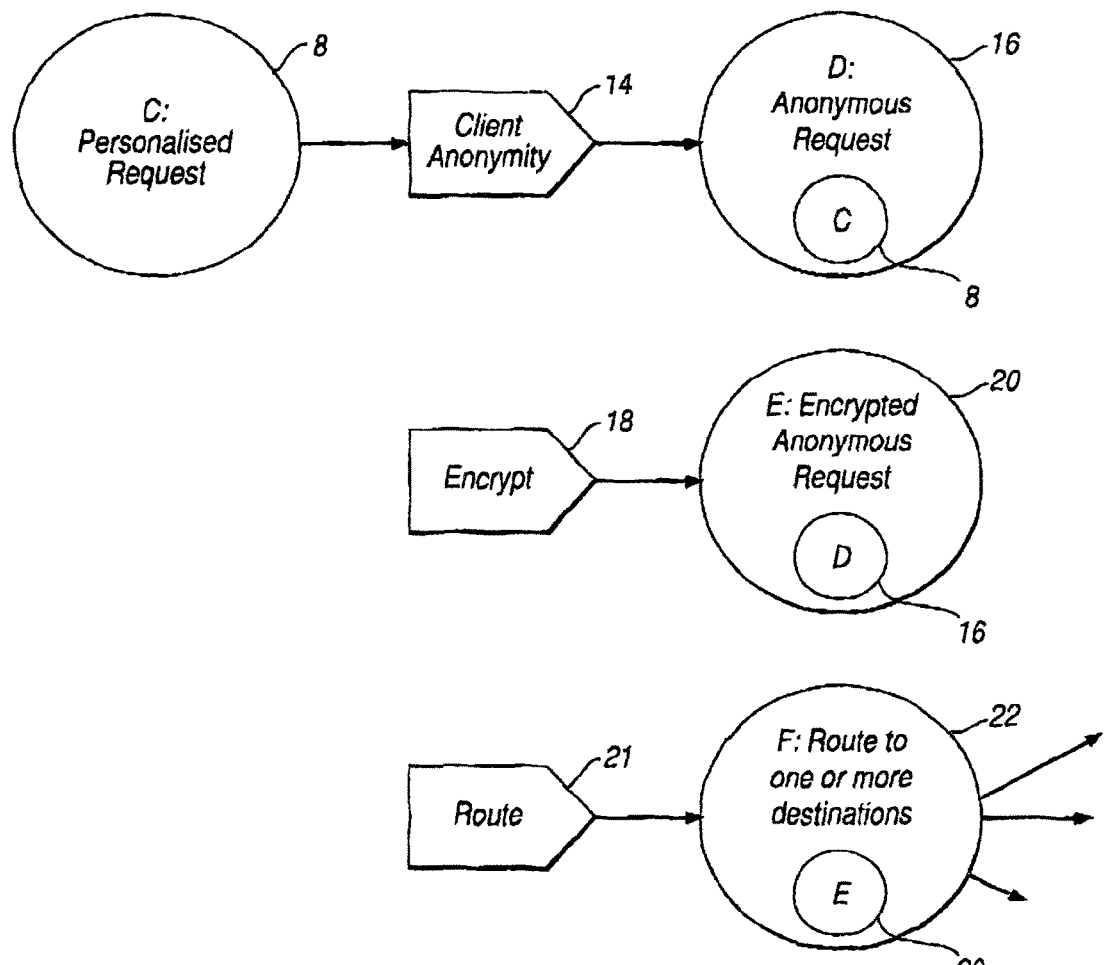

3. With reference to FIG. 3, the personalised request object 8 is passed to the processing applications. These may exist as internal applications or be external. Consequently, the type and nature of the transmission may to be modified. For example, personal details may need to be made anonymous (at 14) for some enquiries for legal reasons (creating an anonymous request 16) whilst other information may need to be encrypted (at 18) for security to produce an encrypted request 20. Routing information 21 is added to create the packet 22.

4. It will be noted that in each step above, one or more additional layer is added to the object or packet.

5. When packet 22 (which contains the objects 6, 4, 8, 16, and 20 discussed above) is received by an Application Server, the routing details contained in the packet can be discarded and the application can start to unwrap the object using known rules (as defined by its interface) to retrieve the information, as appropriate e.g. decrypting, until the original request is known.

6. Upon completion of its processing, the application takes the original request elements and constructs a return object that contains the original request and client information together with any response that will itself identify who and where the response has been generated. A contract relating to the interface between the client and server systems governs the construction of the objects.

7. The response package is then encrypted, if required, and wrapped with suitable routing information to enable it to be returned in an appropriate manner to the client.

8. The results received may be many and these need to be collected prior to informing the client. It may be that results are returned as they are received whilst others may be saved for transmission at a specified time. Typically, the response will be routed to the client's message store and an alert sent using email and/or SMS to advise the client that information is available. The choice of alerts will be defined in the original request.

At each stage, information is used both from the received object and from knowledge of the next stage in the process to produce a new object that is self-describing in terms of the actions that need to take place.

The method for handling the object described above may be a text or binary format, for example, an XML definition with Java-based processing. Encrypted information may be maintained in an ASCII portable format so that it can be freely transmitted without reliance on a true binary connection.

What is claimed is:

1. A method of responding to an information request from a client device, the method including the steps of:
   receiving the information request from the client device;
   wrapping contents of the information request in at least one layer of an object to produce a request object;
   transmitting the request object to at least one node of a plurality of processing nodes over a distributed network, wherein transmission over the distributed network further comprises:
      at least one of the plurality of processing nodes adding a routing layer to the request object containing routing information relating to a next stage in processing of the request object based on the contents of the information request;
      at least one of the processing nodes adding a modification of the contents of the information request as an additional layer of the request object; and
      at least one of the processing nodes generating response data which is responsive to the information request and adding the response data to the request object; and
   transmitting the request object, including the response data and the contents of the information request, back to the client device.

2. The method according to claim 1, wherein the at least one layer of the object includes at least one layer selected from a group containing client device information, user identification information, and application identification information.

3. The method of claim 1, wherein transmitting the request object to at least one node of a plurality of processing nodes over a distributed network further comprises:
   at least one of the processing nodes processing the additional layer of the request object containing the modification without accessing the at least one layer containing the contents of the information request.

4. The method of claim 1, wherein transmitting the request object to at least one node of a plurality of processing nodes over a distributed network further comprises:
   at least one of the processing nodes removing the additional layer of the request object after the additional layer of the request object has been processed.

5. The method of claim 1, wherein at least one of the processing nodes adding a modification of the contents of the information request as an additional layer of the request object further comprises encryption of the contents of the information request.

6. The method of claim 1, wherein at least one of the processing nodes adding a modification of the contents of the information request as an additional layer of the request object further comprises making the contents of the information request anonymous.

7. A method of responding to an information request from a client device, wherein the information request is a search query, the method including the steps of:
   receiving the search query from the client device;
   wrapping contents of the search query in at least one layer of an object to produce a request object;
   transmitting the request object to at least one node of a plurality of processing nodes over a distributed network, wherein transmission over the distributed network further comprises:
      a first processing node generating a first partial response to the search query and adding the first partial response to the request object; and
      a second processing node generating a second partial response to the search query and adding the second partial response to the request object; and
   transmitting the request object, including the first and second partial responses, back to the client device.

8. A system for responding to an information request from a client device, the system including:
   a client device, configured to send the information request to at least one node of a plurality of processing nodes over a distributed network; and
   the plurality of processing nodes, connected to the distribution network and configured to process a request object produced by wrapping contents of the information request in at least one layer of an object, the plurality of processing nodes comprising:
      at least one processing node configured to add a routing layer to the request object containing routing information relating to a next stage in processing of the request object based on the contents of the information request;
      at least one processing node configured to add a modification of the contents of the information request as an additional layer of the request object; and
      at least one processing node configured to generate response data which is responsive to the information request and add the response data to the request object; and
   wherein the client device is further configured to receive the request object including the response data and the contents of the information request.

9. The system according to claim 8, wherein the at least one layer of the object includes at least one layer selected from a group containing client device information, user identification information, and application identification information.

10. The system of claim 8, wherein the plurality of processing nodes further comprise:
    at least one processing nodes configured to process the additional layer of the request object containing the modification without accessing the at least one layer containing the contents of the information request.

11. The system of claim 10, wherein the plurality of processing nodes further comprise:
    at least one of processing nodes configured to remove the additional layer of the request object after the additional layer of the request object has been processed.

12. The system of claim 8, wherein adding a modification of the contents of the information request as an additional layer of the request object includes encryption of the contents of the information request.

13. The system of claim 8, wherein adding a modification of the contents of the information request as an additional layer of the request object includes making the contents of the information request anonymous.

* * * * *